Aug. 7, 1956   J. W. ROBINSON ET AL   2,757,803
APPARATUS FOR SEPARATING IMMISCIBLE LIQUIDS
Filed Jan. 4, 1954   2 Sheets-Sheet 1

*INVENTORS*
**JOHN W. ROBINSON
MARTIN R. SOUDERS**
BY
Charles L. Willson

ATTORNEY

INVENTORS
JOHN W. ROBINSON
MARTIN R. SOUDERS
BY
Charles C. Willson
ATTORNEY

United States Patent Office 2,757,803
Patented Aug. 7, 1956

2,757,803

APPARATUS FOR SEPARATING IMMISCIBLE LIQUIDS

John W. Robinson, Richmond, and Martin R. Souders, Mechanicsville, Va., assignors to Fram Corporation, Providence, R. I., a corporation of Rhode Island Application January 4, 1954, Serial No. 402,103

1 Claim. (Cl. 210—184)

This invention relates to apparatus for separating immiscible liquids having different surface tensions, and more particularly to apparatus adapted to subject the liquid first to a combined filtering and coalescing action and then to a separating action that will pass one liquid but block the other.

The present invention contemplates improvements in the liquid separator and filter of the John W. Robinson Patent No. 2,555,607, and seeks to provide a separator that is more compact and less expensive to manufacture than the separator of said patent.

One object of the present invention is to provide a liquid separator and filter that is free of moving parts and has a large separating capacity for its size.

Another object is to provide a liquid separator that is particularly well adapted to separate water from gasoline, oil, or other hydrocarbons, but which may be used to separate other liquids.

A more specific object of the present invention is to provide a liquid separator and filter comprising an elongated casing closed at one end and having a removable head for closing its other end, which head is provided with an inlet chamber and an outlet chamber, and the head is adapted to have secured thereto one or more coalescers and separators that communicate with the proper chambers and are removed from the casing with the head.

The present liquid separator and filter is capable of producing complete separation even when water and the hydrocarbon are in a tight emulsion, and will act to free the liquid from dirt as well as water for a long period of time without becoming clogged. The water removed from the hydrocarbon stream will settle in the bottom of the casing and can be removed from the casing from time to time. The hydrocarbon as it is cleaned and freed from water will flow out of the separator casing through the discharge chamber.

Figure 1:
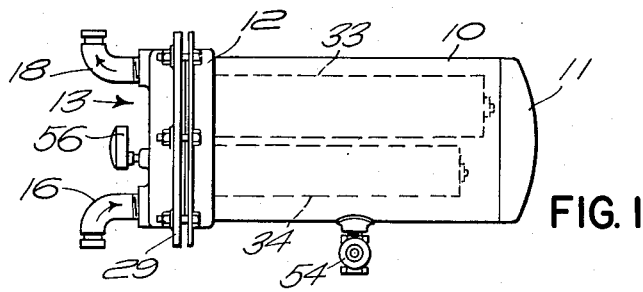

The above and other features of the present invention will be further understood from the following description when read in connection with the accompanying drawings wherein:

Fig. 1 is a side elevation, with parts dotted in, of a liquid separator constructed in accordance with the present invention.

Figure 2:
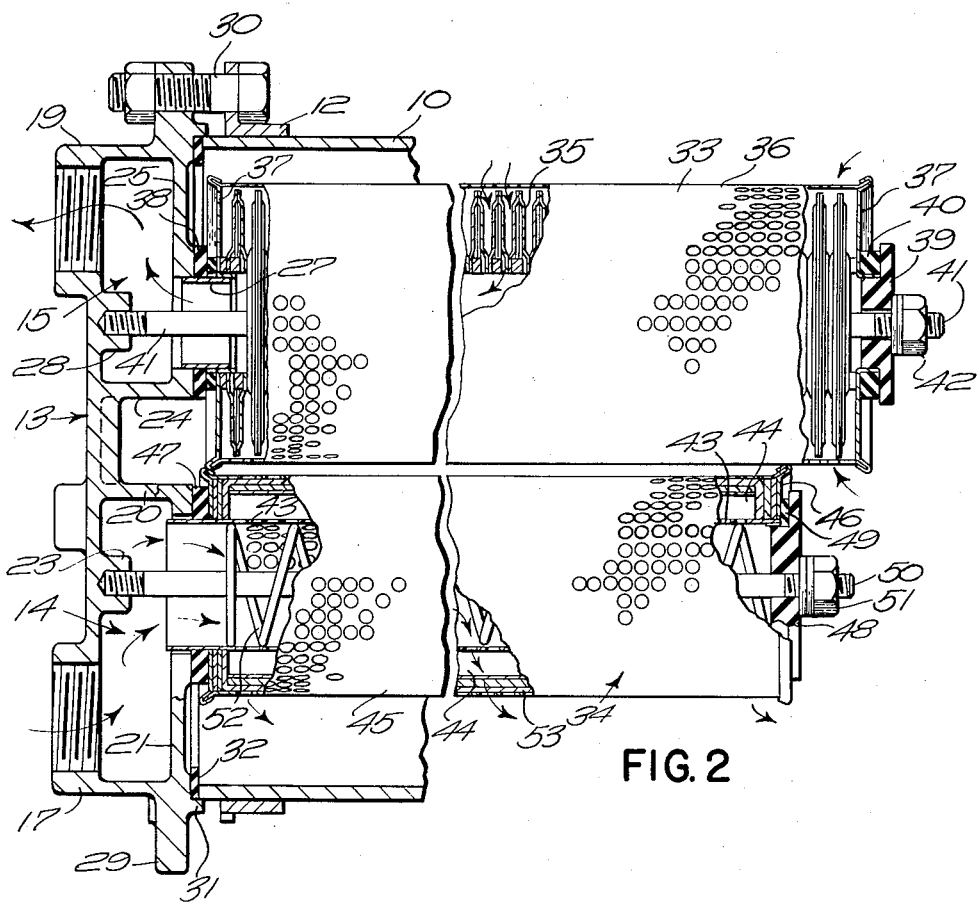

Fig. 2, on a larger scale, is a longitudinal section taken centrally through the upper portion of the separator, and to one side of this central plane in the lower portion of the separator.

Figure 3:
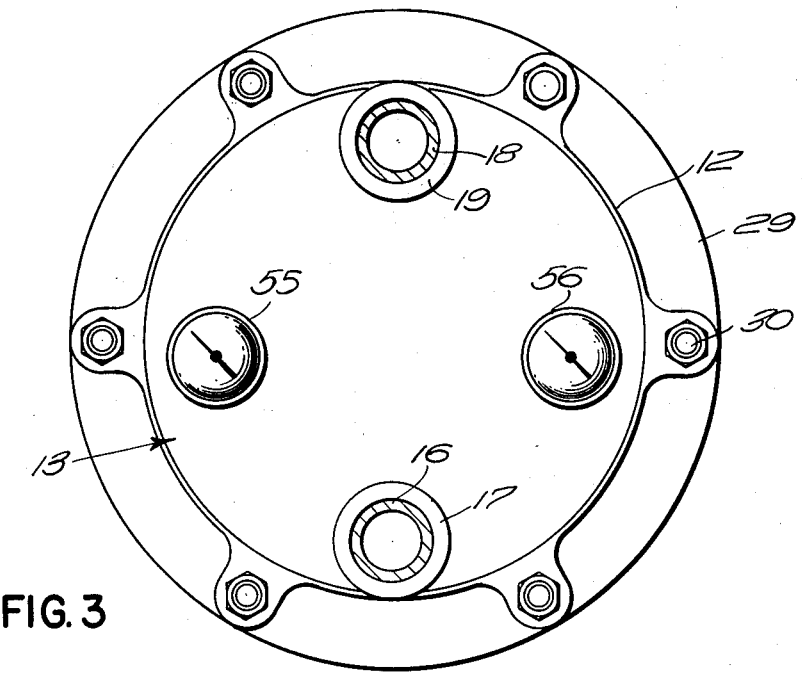
Figure 4:
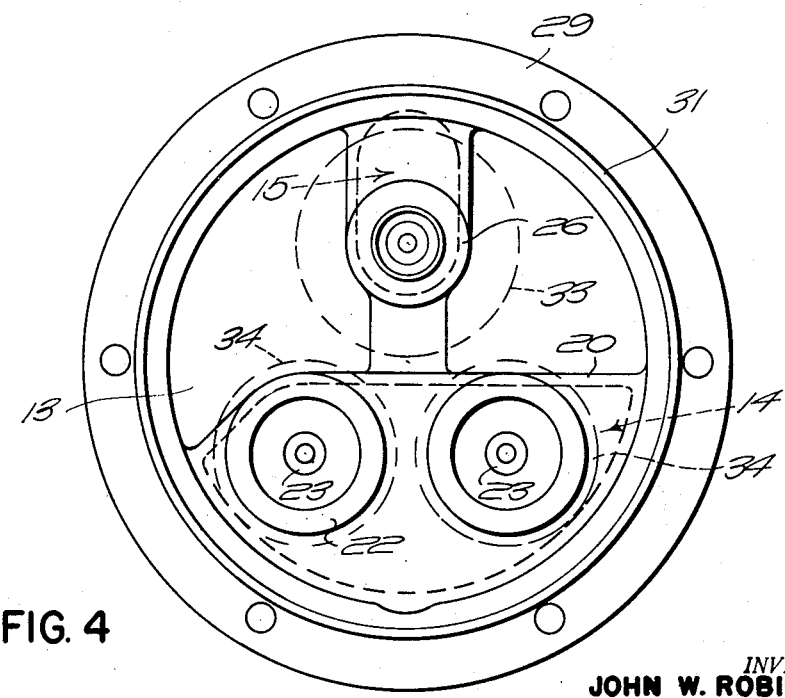

Fig. 3 is an end view looking at the outer face of the removable head of the separator; and Fig. 4 is a similar view of the inner face of such head, with the cartridges indicated in dotted lines.

The liquid separator of the present invention as shown in the drawings comprises a cylindrical metal casing 10 closed at one end as indicated by 11, and near the other end of this casing is provided an annular flange 12 which is welded to the outer surface of the cylindrical casing. This annular flange or ring 12 is provided so that the removable metal head 13 may be tightly secured thereto. The head 13 is shown as provided with the lower or inlet chamber 14 and the upper or outlet chamber 15, and liquid to be separated is supplied to the inlet chamber through a pipe 16 threadedly secured to the boss 17 of the inlet chamber. The liquid after being treated in the separator leaves the discharge chamber 15 through a pipe 18 threadedly secured to the boss 19 of the outlet chamber. The inlet chamber 14 has the upper wall 20 and inner wall 21 which serve to close this chamber off from the interior of the separating casing, and the inner wall 21 is provided with laterally spaced bosses 22 each of which has an annular bore adapted to receive a center tube, to be described. The outer wall of this chamber 14 has projecting inwardly therefrom the threaded bosses 23 each adapted to receive a clamping rod to be described.

The upper chamber 15 is provided with a lower wall 24 and inner wall 25 and this inner wall is provided with a boss 26 which has an annular bore and has secured therein a sleeve 27. The outer wall of this chamber is provided with an inwardly extending boss 28 adapted to receive a threaded end of a bolt to be described.

The separator of the present invention is designed so that the liquid to be treated can be forced rapidly therethrough under considerable pressure. The casing and head are therefore designed to withstand internal pressures of over 100 pounds per square inch. The head 13 is provided with an outwardly extending annular flange 29 having holes therein adapted to receive the clamping bolts 30 which extend through similar holes in the ring 12. The bolt 30 is shown in Fig. 2 as shifted annularly from the position in which it is shown in the other views. The head 13 is preferably provided with a circular flange 31 adapted to embrace the outer surface of the annular casing 10 and within this flange is provided a gasket 32 so that a liquid-tight joint will be provided when the head 13 is clamped tightly to the casing 10.

The separator 33 which is shown as cylindrical in shape is disposed in the upper portion of the casing as indicated in dotted lines in Fig. 1, and the coalescers 34 are disposed in the lower portion of the casing in lateral spaced relation to each other as shown in Fig. 4. The pervious separator is preferably constructed as shown, described and claimed in the Robinson Patent No. 2,654,440 and comprises a plurality of cells 35 formed of paper discs each having a central opening, and these cells are secured one to the other with their openings in axial alignment to provide a passage lengthwise of the separator cartridge formed of these cells. This cartridge is preferably enclosed in a perforated metal tube 36. To each end of this tube is tightly secured a metal disc 37 having a relatively large central opening. This center opening at the left-hand end of the separator cartridge 33, viewing Fig. 2, is of a size to fit over the protruding sleeve 27, and a gasket 38 is provided between this end of the separator and the boss 26. The opening in the disc 37 at the other end of the separator cartridge is closed by a flanged plug 39 and gasket 40 confined between the flanged portion of this plug and the outer face of the metal disc 37. The separator cartridge just described is firmly secured to the head 13 in operating relation thereto by a long threaded bolt 41 that passes centrally through this separator 33, and one end of this bolt is screwed into the boss 28 while the other end has threadedly secured thereto the nut 42. The cells 35 formed of paper are treated as described in said patent with a more or less oily material so that each cell is pervious to a hydrocarbon such as gasoline but is impervious to water, with the result that the hydrocarbon liquid within the casing 10 will pass inwardly through the walls of the cells 35 while the water will be blocked and will drop from the cells by gravity to settle in the lower portion of the casing. The gasoline or other hydrocarbon which passes inwardly through the cell walls will travel longitudinally within the center passage of the separator cartridge as indicated by the arrows to enter the discharge chamber 15 and pass outwardly therefrom through the pipe 18.

While the separator cartridge just described does an excellent job in removing water from a hydrocarbon liquid, it is important to keep the outer surface of the cells clean by avoiding the accumulation of dirt and foreign matter thereupon. It is therefore desirable to provide in the lower portion of the casing 10 one or more filters and coalescers, two being shown in the drawings, which serve to remove solids or contaminants from the hydrocarbon stream, and also to initiate formation of the minute parts of water in the hydrocarbon stream into droplets so that they may be more effectively removed by the separator cartridge 33. The coalescer cartridges 34, as shown, each comprises a perforated inner metal tube 43 about which is provided a combined filter and coalescer in the form of a pleated sheet of paper folded about the tube 43 in the form of a cylinder 44 and having the pleats extending longitudinally of the cylinder. This pleated cylinder is enclosed in a perforated outer metal tube 45, the opposite ends of which are closed with the discs 46 each of which has a relatively large center opening. The inner tube 43 projects through the center opening in the left hand disc 46 and extends into the boss 22 of the head 13 as shown in Fig. 2. A gasket 47 is provided between this end disc and the boss 22. The opposite end of each coalescer 34 is closed with a flanged disc 48 and gasket 49. Each coalescer cartridge 34 is firmly secured in place by a clamping bolt 50 one end of which is threadedly secured to a boss 23 and the other end is provided with a clamping nut 51. The coalescer 34 is shown in Fig. 2 as having within the inner metal tube 43 a coiled re-inforcing spring 52 adapted to prevent the tube from being sprung inwardly under an external pressure. This spring, however, is more important when the type of coalescer shown is used with an outside-in flow rather than an inside-out flow as here illustrated. The filtering and coalescing properties of the cartridge 34 are much improved by placing around the folded paper cylinder 44 a batt 53 of fine fiber glass.

It will be seen from the foregoing that the two coalescer cartridges 34 and the separator cartridge 33 are secured to the head 13 so that they can be removed from the casing 10 when this head is removed. When the separator of the present invention is in use, the hydrocarbon liquid to be freed of dirt and water is forced through the separator so that it first enters the chamber 14 and then the interior of the perforated metal tube 43, as indicated by the arrows, to pass outwardly through the holes in this tube and through the porous paper forming the filter and coalescer 44, and then outwardly through the apertures of the outer metal tube 45 to fill the casing 10. The dirt carried by this liquid is removed by the pleated paper cylinder 44 which serves also to coalesce the water in the hydrocarbon stream. The hydrocarbon liquid confined in the casing 10 upon contacting the cells 35 of the separator cartridge will pass through the walls of these cells, while the water within such stream will be blocked by the cells and will accumulate in droplets on the outer walls thereof to fall therefrom by gravity. The hydrocarbon, free from water, will then pass longitudinally of the center bore of the separator cartridge 33 in the direction indicated by the arrows to enter the discharge chamber 15 and pass outwardly therefrom through the discharge pipe 18.

As water accumulates in the lower portion of the casing 10 it may be removed therefrom through a discharge valve 54. The operating pressure within the inlet chamber 14 is shown by a gauge 55, and the operating pressure within the casing 10 is shown by a gauge 56.

The speed at which the liquid separator of the present invention will remove water from a hydrocarbon stream, or other liquid having water dispersed therein, is surprisingly high. Actual tests show that a separator casing constructed as above described and which is about 10 inches in diameter and about 24 inches long is capable of removing up to 3 percent of water from a stream of gasoline at the rate of about thirty gallons per minute. If the casing 10 is made about 14 inches in diameter and 24 inches long and is provided with two separator cartridges and four coalescer cartridges, it will be capable of treating about sixty gallons of gasoline per minute. Furthermore, it is found that unless the hydrocarbon being treated carries an exceptionally large amount of dirt, the separator of the present invention may be used for many months before the cartridges become so laden with dirt that it is necessary to replace them with new cartridges.

I claim:

A two-stage liquid separator for separating immiscible liquids having different surface tensions, comprising a horizontally extending casing closed at one end, a removable head for closing its other end and provided with a lower inlet chamber and an upper outlet chamber, a coalescer cartridge secured to the head in communication with the inlet chamber and extending longitudinally in the casing, a separator cartridge secured to the head in communication with the outlet chamber to extend longitudinally in the casing and above the coalescer cartridge, the cartridges being supported by the head and removable therewith, and means for supplying a liquid to be separated to the coalescer cartridge and then to the exterior of the separator cartridge so that one liquid will pass through the wall of this separator but the other liquid will be blocked by such wall to fall therefrom by gravity.

References Cited in the file of this patent

UNITED STATES PATENTS

| | | |
|---|---|---|
| 2,276,118 | Taylor | Mar. 10, 1942 |
| 2,304,618 | Williams | Dec. 8, 1942 |
| 2,362,530 | Bennett | Nov. 14, 1944 |
| 2,374,953 | Pickard | May 1, 1945 |
| 2,545,374 | Nugent | Mar. 13, 1951 |
| 2,584,394 | Marvel | Feb. 5, 1952 |
| 2,609,932 | Fricke | Sept. 9, 1952 |
| 2,611,490 | Robinson | Sept. 23, 1952 |
| 2,626,709 | Krieble | Jan. 27, 1953 |